United States Patent [19]

Ota

[11] Patent Number: 5,408,331
[45] Date of Patent: Apr. 18, 1995

[54] OPTICAL DISK REPRODUCING APPARATUS HAVING SELECTABLE PROCESSING SPEEDS

[75] Inventor: Kiyoshi Ota, Tokyo, Japan

[73] Assignee: Sony Corporation, Tokyo, Japan

[21] Appl. No.: 161,696

[22] Filed: Dec. 3, 1993

Related U.S. Application Data

[63] Continuation of Ser. No. 808,175, Dec. 13, 1991, abandoned.

[30] Foreign Application Priority Data

Dec. 28, 1990 [JP] Japan ................... 2-416342

[51] Int. Cl.$^6$ ............................................. H04N 5/76
[52] U.S. Cl. .................................. 358/341; 358/342; 358/343; 360/69; 360/73.01; 360/73.03
[58] Field of Search ............... 358/341, 342, 343, 330, 358/335; 360/69, 73.01, 73.02, 73.03; H04N 5/76

[56] References Cited

U.S. PATENT DOCUMENTS

| | | | |
|---|---|---|---|
| 4,646,280 | 2/1987 | Toyosawa | 358/342 |
| 4,800,446 | 1/1989 | Kanamura | 358/343 |
| 4,864,428 | 9/1989 | Kanamaru | 358/337 |
| 5,128,775 | 7/1992 | Suzuki et al. | 358/343 |

Primary Examiner—Tommy P. Chin
Assistant Examiner—Khoi Truong
Attorney, Agent, or Firm—Charles P. Sammut; Limbach & Limbach

[57] ABSTRACT

A CD-I player for reproducing from a CD-I disc 2 both recorded audio information but and recorded video information and the like is recorded, is disclosed. The frequency of the clock signals of a MCPU 61 for executing a program is changed by a frequency divider 67 and a changeover switch 69. So that the speed of program execution may be changed according to the particular application or usage of the player or the liking of the user.

5 Claims, 4 Drawing Sheets

OPTICAL DISK REPRODUCING APPARATUS HAVING SELECTABLE PROCESSING SPEEDS

This is a continuation of application Ser. No. 07/808,175 filed on Dec. 13, 1991, now abandoned.

BACKGROUND OF THE INVENTION

This invention relates to an optical disc reproducing apparatus for reproducing a so-called compact disc interactive (CD-I) on which the video information, such as picture or letter information, computer data, application programs etc. are recorded besides the audio information.

There is currently proposed a system, known as a CD-I system, in which video data, such as natural picture, RGB graphics, color lookup table graphics, animation etc., computer data, or application programs, abbreviated hereinafter to programs, are recorded on a compact disc, in addition to audio data, and in which a user may use these data interactively. Inasmuch as this CD-I system has the functions of reproducing the voice, letters or pictures, and executing program(s), and may be used in connection with AV devices for mainly audio and video information and electronic publication mainly of letter or character information as well as educational or amusement devices, which rely upon program execution, it is thought to be a promising new type medium system.

The CD-I system is made up of an optical disc on which audio data, video data or the like are recorded, referred to hereinafter as a CD-I disc, and a player for reproducing a CD-I disc, referred to hereinafter as a CD-I player. Various specifications have been prescribed in connection with the CD-I system with a view to maintenance of interchangeability and extensive propagation for domestic use.

For example, in a CD-I disc, audio and video data, for which high accuracy is not a particular requirement, are recorded in accordance with a so-called form 2 of the CD-I data format, while computer data or programs, which are in need of error detection and correction, are recorded in accordance with a so-called form 1 of the CD-I data format.

With the CD-I system, four sound quality levels may be used, so that the audio data are processed with four-level data compression or coding, depending on the desired sound quality level, before being recorded on the CD-I disc. Thus the recorded data may be 16-bit PCM (Pulse Code Modulation) audio data for a conventional compact disc, 8- or 4-bit ADPCM (Adaptive Differential Pulse Code Modulation) audio data, or so-called A-level, B-level or C-level audio data.

On the other hand, four picture quality levels, namely the picture quality for natural pictures, e.g. color photographs, that for RGB graphics, that for color lookup table graphics (CLUT graphics) and that for animation, may be used with the CD-I system, so that the video data are processed with data compression or encoding in accordance with the desired picture quality before being recorded on the CD-I disc. That is, with the picture quality for natural picture, the video data are encoded with 8 bits per pixel and processed with non-interlaced DYUV encoding for recording. With the picture quality for RGB graphics, three color signals (RGB signals) for each pixel are encoded with 5 bits for recording, with the picture quality for CLUT graphics, the video data are recorded so that 256 colors may be displayed simultaneously by allocating 8 bits for each pixel. Finally, with the picture quality for animation, the video data for the CLUT graphics are processed with data compression by the so-called run-length coding for recording.

Meanwhile, a 68000 series microcomputer, which is a 16-bit CPU developed by MOTOROLA Inc. is preferentially employed as a microcomputer making up a CD-I player, while a so-called compact disc real-time operating system (CD-RTOS), corresponding to the existing OS-9, an operating system developed by MICROWEAR Inc. but added to by input/output managers and drivers for graphics/visual, pointer and audio processing operations, is preferentially employed as an operating system (OS), in consideration of program interchangeability and execution efficiency on the CD-I disc. In addition, an X-Y device, which may be accessed on the pixel-by-pixel basis, and a trigger button (for execute/stop), are preferentially employed as input devices. Besides, a compact disc (CD), on which only music has been recorded, may also be reproduced with the CD-I system.

The CD-I player, for which a variety of specifications are prescribed as depicted above and which may be used as a variety of devices, such as AV, electronic publishing, educational or amusement devices, are preferably so designed as to cope the speed of execution which is suited to the particular application or usage or which is desired by the user. For example, while the retrieval speed as fast as possible is desirable when the player is used as an electronic publishing device, such as that for dictionaries, it would be meaningless to increase the operating speed when the player is used as, for example, an AV device. Also, when the player is used as a game device, a user skilled in games would prefer a faster game progress, that is, a faster speed of execution, whereas an unskilled user would prefer a slower speed of execution.

Meanwhile, the speed of execution of a program depends on the frequency of the clocks supplied to the CPU, such that the speed of execution is increased with a higher frequency. The CD-I player in current use has a fixed clock frequency, so that the program can be executed only at a fixed speed.

OBJECT AND SUMMARY OF THE INVENTION

In view of the above described state of the art, it is a principal object of the present invention to provide an optical disc reproducing apparatus wherein the speed of program execution may be changed freely depending on the particular usage or application of the apparatus and the preference of the user.

In accordance with the present invention, there is provided an optical disc reproducing apparatus for reproducing an optical disc on which video information or the like is recorded in addition to audio information, comprising a microcomputer for executing a program, and clock supplying means for supplying frequency-variable clocks to said microcomputer.

With the optical disc reproducing apparatus of the present invention, the frequency of the clock signal supplied to the microcomputer may be changed for changing the speed of program execution.

DESCRIPTION OF THE PREFERRED EMBODIMENT

Figure 1:
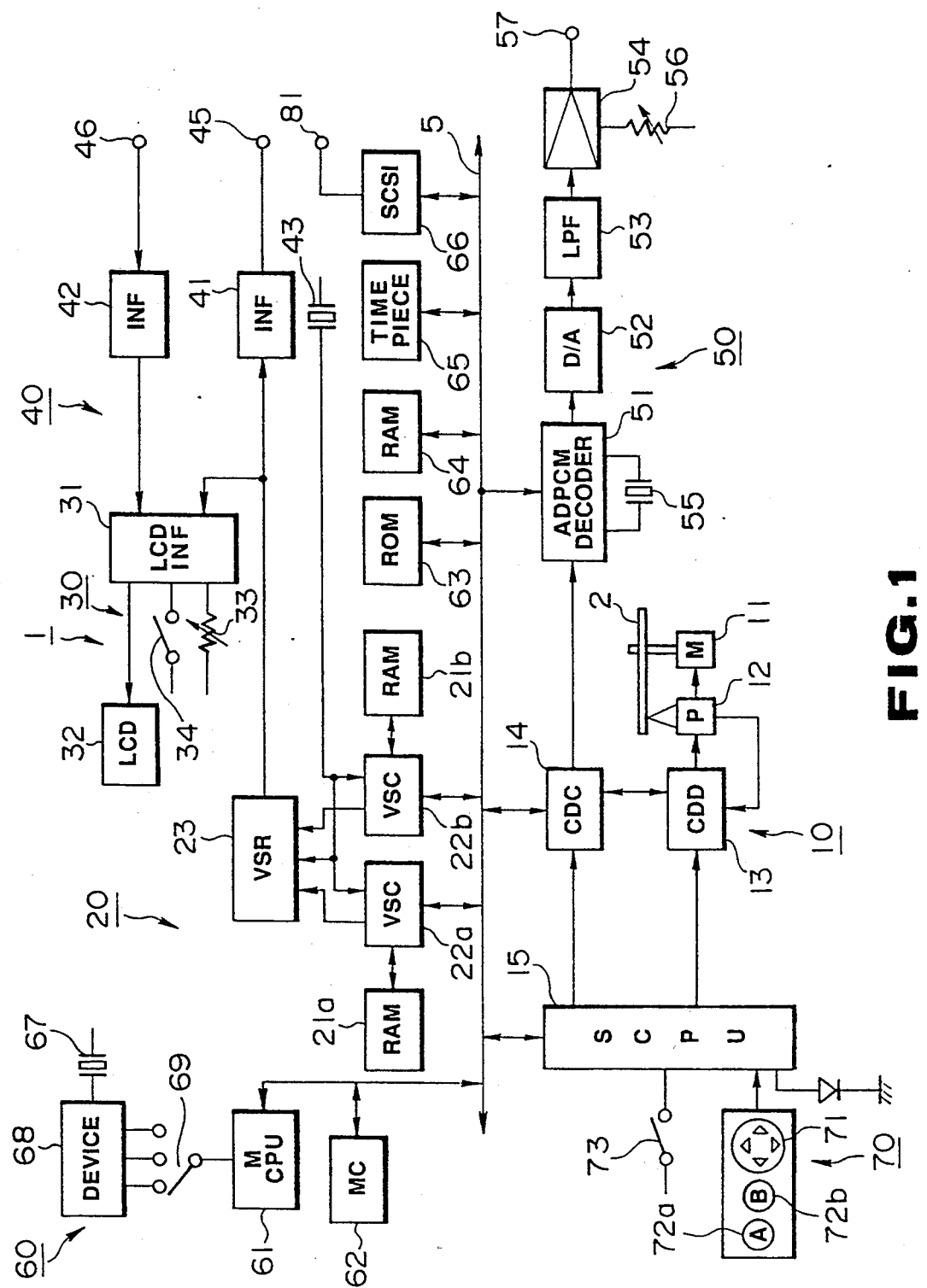
FIG. 1 is a block circuit diagram showing a construction of a CD-I player according to the present invention.

Referring to the drawings, an optical disc reproducing apparatus embodying the present invention will be explained in detail.

FIG. 1 is a block circuit diagram showing a circuit construction of a portable optical disc reproducing apparatus according to the present invention, referred to hereinafter as a CD-I player.

Referring to FIG. 1, the CD-I player 1 is made up of a disc driving section 10 for reproducing audio data, video data or programs from a compact disc on which video data, computer data or application programs are recorded in addition to audio data, a picture signal processing section 20 for generating video signals from video data, a display section 30 for displaying e.g. contents of operations OF programs on the basis of the video signals, a picture signal interfacing section 40 for converting the video signals into video signals conforming to, for example, the NTSC system, a voice signal processing section 50 for reproducing audio signals from the audio data, a controller for executing the program and controlling the sections 10, 20 and 50, and an operating section 70 for operation by a user. Meanwhile, the sections 10, 20 and 50 and the controller 60 are connected together by a common bus 5.

On the CD-I disc 2, there are recorded video data, computer data and programs in accordance with predetermined formats, that is, in accordance with the form 1 or form 2 of the CD-I data format, in addition to the audio data, as explained previously.

The disc driving section 10 is constituted by a spindle motor 11 for rotating the CD-I disc 2 at a constant linear velocity (CLV), a pickup 12 for irradiating the CD-I disc 2 with a laser beam and for detecting the intensity of the reflected laser beam for reproducing RF signals, a compact disc drive (CDD) 13 for controlling the spindle motor 11 and the pickup 12 and for demodulating the RF signals to produce audio data, a compact disc error correction circuit (CDC) 14 for performing error detection and correction of modulated data from CDD 13, and a subcomputer (SCPU) 15 for controlling mainly the CDD 13 and the CDC 14. The CDD 13 is provided with a focusing servo circuit, a tracking servo circuit and a thread servo circuit and the like, and adapted for servo-controlling a biaxial device of the pickup 12 and controlling a thread motor, in general a linear motor, for radially moving the pickup 12, to permit the pickup 12 to access the desired track. The CDD 13 is also provided with, for example, an equalizer, a waveforming circuit, a clock reproducing circuit and an EFM (Eight-to Fourteen Modulation) demodulator, and adapted for reproducing data such as the audio data from the playback RF signals. The CDC 14 is adapted for performing an error correction on computer data or the like in need of error correction and outputting audio data compressed in accordance with ADPCM under control by the controller 60 (ADPCM audio data), video data, computer data and the programs to the bus 5, while directly outputting uncompressed 16-bit audio data (PCM Audio Data), to the voice signal processing section 50.

The picture signal processing section 20 includes two channels of video signal processing circuits for picture superposition and switching. Specifically, the picture signal processing circuit is constituted by RAMs 21a, 21b for transiently storing video data transmitted from the CDC 14 over bus 5 by, for example, so-called direct memory accessing (DMA), video controllers (VSCs) 22a, 22b for processing the video data stored in RAMs 21a, 21b with so-called DYUV decoding and run-length decoding etc. for reproducing the video data, and a video synthesizer 23 for superposing and switching the video data from the VSCs 22a, 22b and for converting the video data into analog signals.

The display section 30 is constituted by an LCD interfacing circuit 31 (LCDTNF) for driving a liquid crystal display panel 32 (LCD), based on analog video signals from VSR 23 and the above mentioned LCD 32. The LCDTNF 31 is provided with a volume 33 for adjusting the contrast of the LCD 32 and a switch 34 for terminating the display of the LCD 32 for power saving.

The video signal interfacing section 40 includes an interfacing circuit 41 (INF), for converting the video signals from VSR 23 into video signals conforming to, for example, the NTSC system or the PAL system, an INF 42 for effecting a conversion which is the reverse of that effected by the INF 41, and a crystal oscillator 43 for supplying clocks of frequencies suited to the respective systems to the VSCs 22a, 22b and VSR 23. The video signals converted by INF 41 into signals conforming to the desired system are outputted via video output terminal 45 to, for example, a television receiver, not shown. On the other hand, video signals from a video tape recorder, not shown, are supplied via video input terminal 46 to the INF 42. Meanwhile, the oscillating frequency of the crystal oscillator 43 is 30.202979 MHz and 30.00 MHz for the NTSC system and for the PAL system, respectively.

The voice signal processing section 50 includes an ADPCM decoder 51 for decoding ADPCM audio data transmitted over bus 5 from CDC 14, a digital/analog (D/A)converter 52 for converting the decoded PCM audio data from the ADPCM decoder 51 or the PCM audio data directly transmitted from CDC 14 into analog signals, a low-pass filter (LPF) 53 and an amplifier 54 for amplifying the audio signals converted into the analog signals. The ADPCM decoder 51 is provided with a crystal oscillator 55 of, for example, 16.9 MHz. The amplifier 54 is provided with a volume 56 for adjusting the sound volume. The audio signals, thus adjusted by the volume 56, are outputted via audio output terminal 57 to, for example, a headphone, not shown.

The controller 60 includes a 68000 series microcomputer (MCPU) 61, a master controller MC 62 for decoding the addresses from MCPU 61 and controlling the DMA, a ROM 63 for storing, above all, so-called CD-RTOS (Compact Disc Real-Time Operating System) 63, a non-volatile RAM 64 for transient data storage during program execution, a timepiece circuit 65 for time supervision, a small computer system interface (SCSI) 66 for exchanging data or commands with, for example, a host computer via data input/output terminal 81, a crystal oscillator 67 for supplying a clock signal to MCPU 61, a frequency divider 68 for frequency dividing the clock signal from the crystal oscillator 67, and a changeover switch 69 for selecting one of a plurality of clock signals with different frequencies from the frequency divider 68 and supplying the selected clock signal to MCPU 61.

The operating section 70 is constituted by a user-manipulated X-Y device 71, which may be accessed on the pixel-by-pixel basis, trigger buttons 72a, 72b and a door switch 73 for turning off the power for power saving when the user failed to turn off the power switch when closing a lid, as described subsequently.

An outward aspect of the above described CD-I player 1 will be explained briefly hereinbelow. It is noted that parts and components which are the same as those shown in FIG. 1 are denoted by the same reference numerals.

Figure 2:
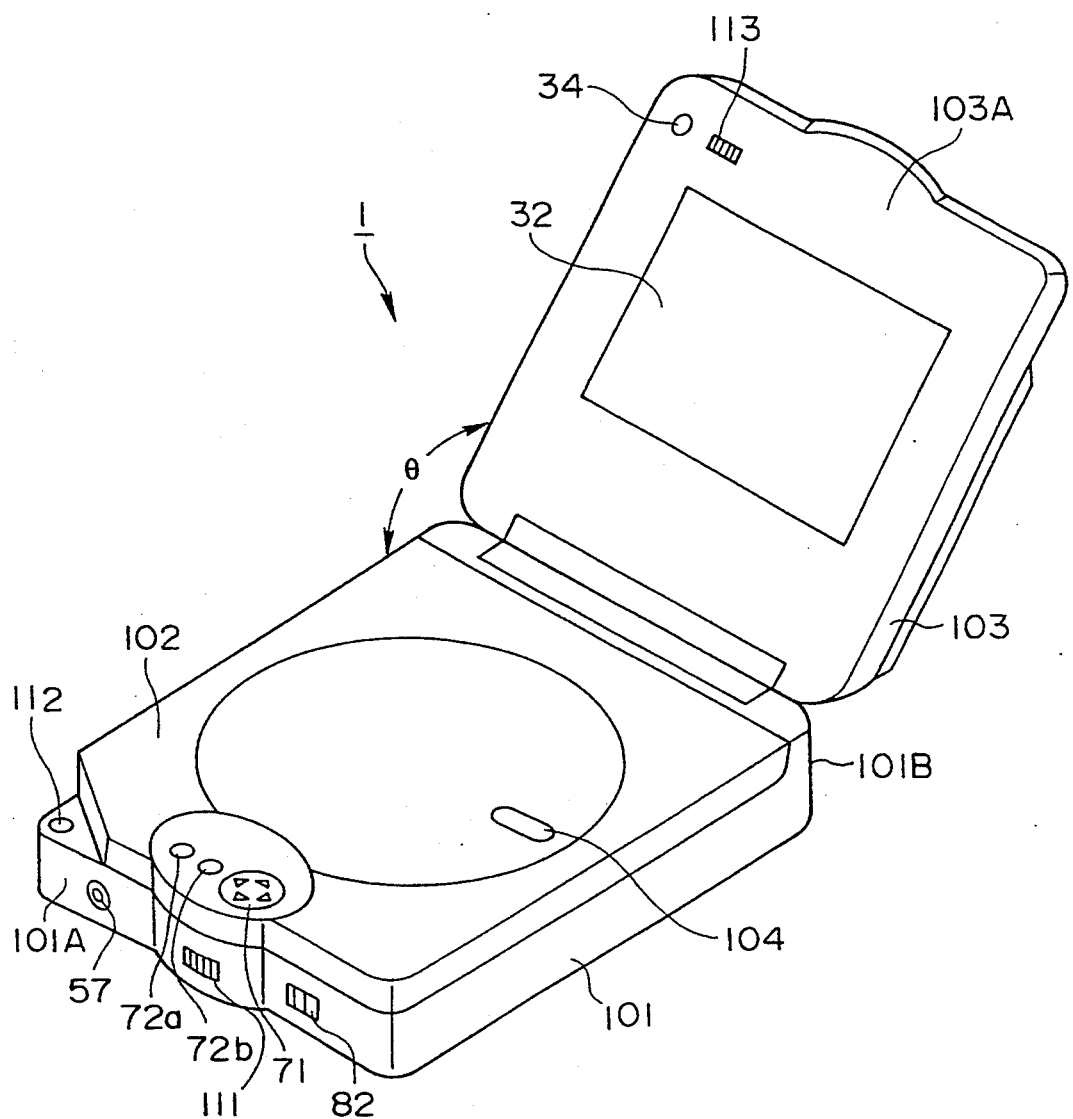
FIG. 2 is a perspective view showing the CD-I player shown in FIG. 1.

The CD-I player 1 may for example be 140 mm in width, 170 mm in length and 60 mm in height, for facilitated portability, as explained previously. Referring to FIG. 2, the CD-I player 1 is provided with a main body section 101, an intermediate lid 102 fitted to the main body section 101 for opening and closure and an outer lid 103 having its side edge fitted to a side edge of the body section 101 for opening and closure.

The above mentioned disc driving device 10, the picture signal processing section 20, the picture signal processing section 40, the voice signal processing section 50, the controller 60 and the operating section 70 adapted for operation by the user, are accommodated within a casing of the main body section 101. Referring to FIG. 2, the above mentioned audio output terminal 57, a sound volume adjustment dial 111 for adjusting the volume 56 and a power switch 82 are fitted on a forward surface 101A of the main body section 101, whilst the above mentioned video output terminal 45, video input terminal 46, data input/output terminal 81 and the changeover switch 69 are provided on a rear surface 101B of the main body section 101. An opening button for opening the intermediate lid 102 is provided at an upper forward edge of the main body section 101.

The intermediate lid 102 is adapted for being opened on pushing the button 112 to permit the loading/unloading of the CD-I disc 2. The lid 102 is provided with a window 104 in which a transparent member is provided to permit checking of the loading/unloading state of the CD-I disc 2 or the state of its rotation via window 104. The above mentioned X-Y device 71 and the trigger buttons 72a, 72b are provided at a forward edge of the intermediate lid 102 so that desired positions in the X and Y directions may be designated on pressing portions of the X-Y device offset from its central portion.

The outer lid 103 may be opened manually by more than 90° and fixed at a predetermined opening position. The above mentioned LCD 32, a contrast dial 113 for adjusting the volume 33 and a switch 34 are provided on a reverse surface 103A of the outer lid 103. On opening the outer lid 103, the LCD 32 is exposed to permit the screen of the LCD 32 to be viewed.

It will be appreciated that, with the present embodiment, the MCPU 61 is used as a microcomputer for program execution, and clock supplying means includes a crystal oscillator 67, frequency divider 68 and the changeover switch 69.

The operation of the above described CD-I player will be hereinafter explained.

It is noted that, with the present CD-I player 1, a conventional compact disc, on which only audio data are pre-recorded, may also be reproduced. The disc on which only the PCM audio data are pre-recorded is termed a CD-DA disc while the disc on which ADPCM audio data other than the PCM audio data, video data and the program(s) etc. are pre-recorded, is termed a CD-I disc and the disc on which the PCM audio data, ADPCM audio data, video data, programs etc. are pre-recorded, is termed a CD-I/CD-DA disc.

Figure 3:
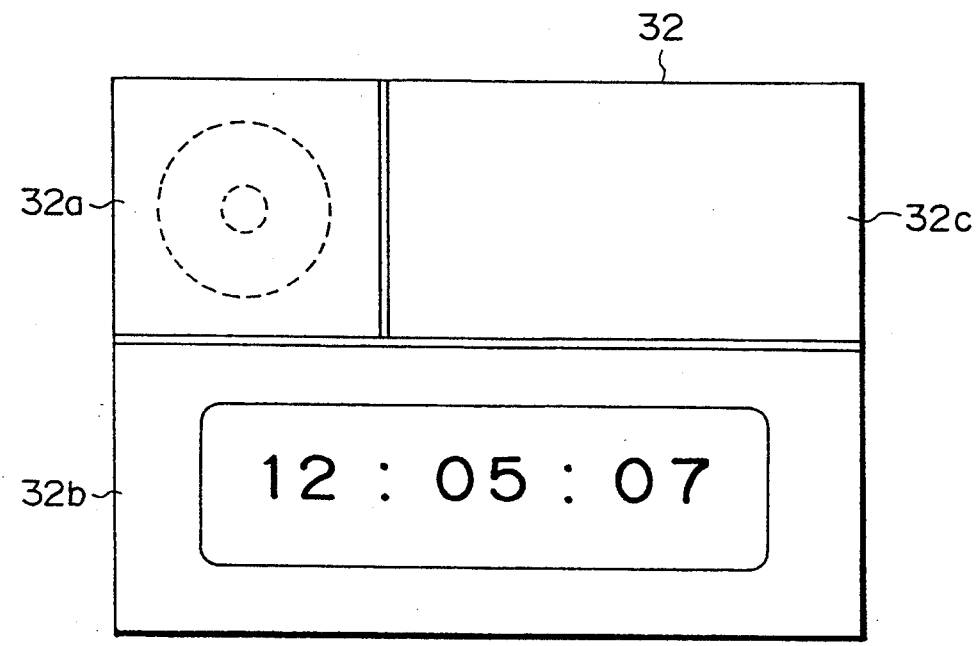
FIG. 3 is a schematic view showing an illustrative display made on the CD-I player shown in FIG. 2, in which a disc is not yet loaded.
Figure 4:
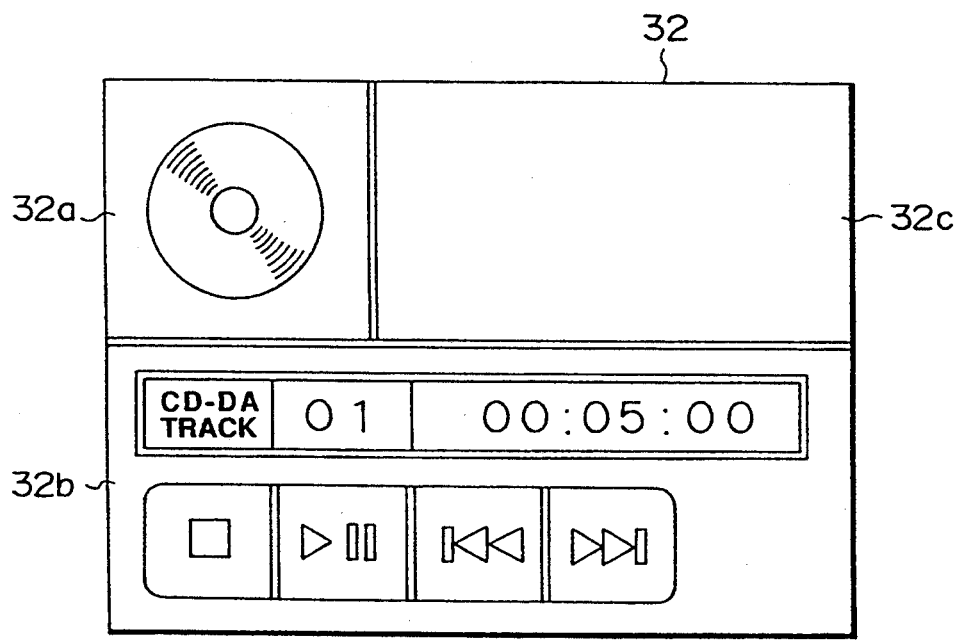
FIG. 4 is a schematic view showing an illustrative display made on the CD-I player shown in FIG. 2, in which a CD-DA disc has been loaded.

When the power switch 82 of the CD-I player 1 is turned on, an indication that the disc is not yet loaded is made on a display area 32a of the LCD 32, while a calendar or time is displayed on a display area 32b thereof, as shown for example in FIG. 3. When the disc is then loaded in the CD-I player 1, disc reproduction is initiated. The table-of-contents data recorded on the disc are reproduced by CDC 14 so as to be transmitted to MCPU 61. Based on the TOC data, the MCPU 61 decides which type of the disc has been loaded and accordingly controls the picture signal processing section 20 and the display section 30 to make a display corresponding to the type of the loaded disc.

When the CD-DA disc, for example, has been loaded, a display to the effect that the disc has been loaded is made on the display area 32a, while indications for PLAY, AMS and STOP, necessary for music reproduction, are made on the display area 32b. If now the user operates the X-Y device 71 and the trigger buttons 72a, 72b based on the display contents, the CD-DA disc is reproduced in accordance with the operations. That is, the PCM audio data reproduced by the disc driving section 10 are converted into audio signals by the D/A converter 52 and the LPF 53 so as to be outputted to the headphone via amplifier 54 and audio output terminal 57.

Figure 5:
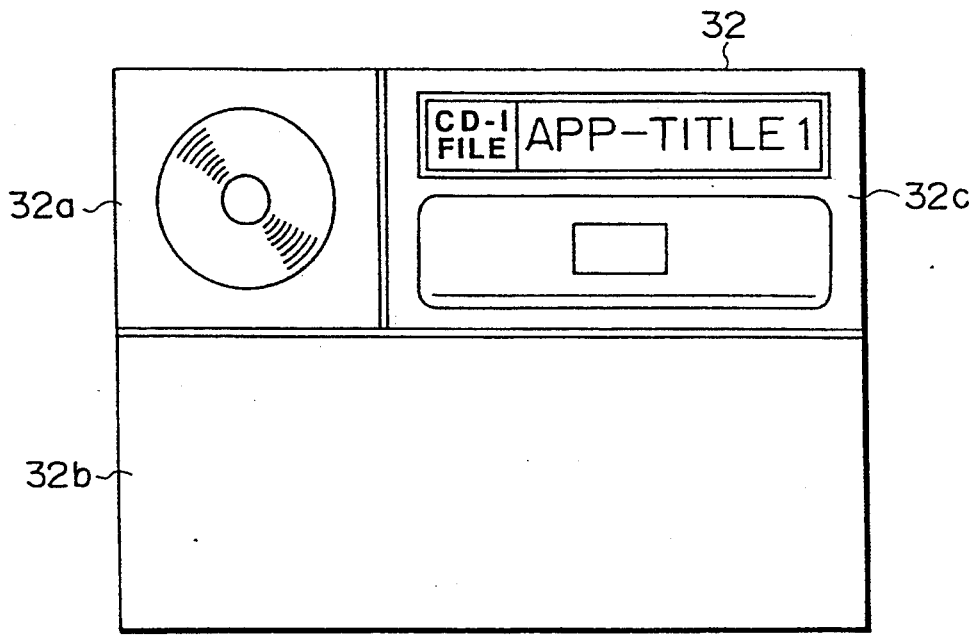
FIG. 5 is a schematic view showing an illustrative display made on the CD-I player shown in FIG. 2, in which a CD-I disc has been loaded.

If a CD-I disc, for example, is loaded, an indication to that effect is made on the display area 32a, while a title of the application program, for example, is displayed on the display area 32c, as shown in FIG. 5. If now the user operates the X-Y device 71 and the trigger buttons 72a, 72b based on the display contents, the application program is executed in accordance with the operations. That is, the program reproduced by the disc driving sect, ion 10 is transferred to, for example, the RAM 64, and the MCPU 61 executes the program based on the stored program. In this case, natural pictures or animations are generated in the picture signal processing section 20 as a result of the program execution and are displayed on the overall screen of the LCD 32, while music or narration is reproduced by the voice signal processing section 50 so as to be outputted to the headphone.

Figure 6:
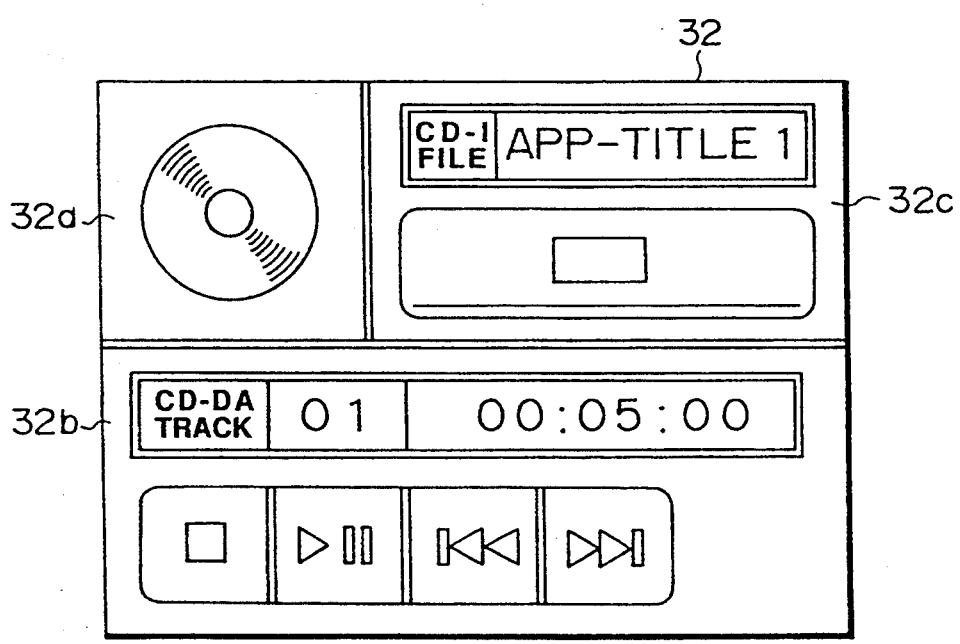
FIG. 6 is a schematic view showing an illustrative display made on the CD-I player shown in FIG. 2, in which a CD-I/CD-DA disc has been loaded.

If a CD-I/CD-DA disc, for example, is loaded, an indication to that effect is made on the display area 32a, and the indications of PLAY, AMS and STOP, necessary for music reproduction, are made on the display area 32b, while a title of the application program, for example, is displayed on a display area 32c of the LCD 32, as shown in FIG. 6. If now the user operates the X-Y device 71 and the trigger buttons 72a, 72b based on the display contents, the music is reproduced, or the application program is executed, in accordance with the operations.

It will be seen from above that the present CD-I player 1 has the function of reproducing the voice or picture and executing an application program or the like, so that it may be used as, for example, an AV device, electronic publishing device or as educational or amusement devices. The present CD-I player 1 may be operated at a speed suited to the particular application or usage of the player or desired by the user by changing the frequency of the clock signal supplied to the MCPU 61.

Specifically, the frequency f MHz of the clocks from the quartz oscillator 67 is divided by frequency divider 68 into ½, ⅓ or ¼ by frequency divider 68 and one of the ½MHz, ⅓ MHz and ¼ MHz clock signal from the frequency divider 68 is selected by the changeover switch 69 so as to be supplied to MCPU 61. The result is that, if the frequency of the clock signal supplied to the MCPU 61 is increased, the DMA transfer speed and the speed of program execution of the MCPU 61 are increased as compared to the clock frequency, so that the speed of program execution is increased. That is, the speed of execution suited to the particular application or usage of the player or desired by the user may be produced by operating the changeover switch 69. It is noted that, even although the frequency of the clock signal supplied to the MCPU 61 is changed, the oscillating frequency of the quartz oscillator 43 supplying the clock signal to the VSR 23 etc. or that of the quartz oscillator 55 supplying the clock signal to the ADPCM decoder 51 is not changed, so that reproduction of the sound or pictures remains unaffected.

With the present embodiment, the speed of execution suited to the particular application or usage of the player or desired by the user may be easily obtained by changing the frequency of the clock signal supplied to the MCPU 61.

It is to be noted that the present invention is not limited to the above embodiments. For example, clock signals from the quartz oscillator 43 or 55 may be supplied to the frequency divider 68 instead of those from the quartz oscillator 67. If the clocks from the quartz oscillator 43, having a frequency of, for example, 30 MHz in the case of the PAL system, are employed, they are divided in frequency by the frequency divider 68 by, for example, ½, ⅓ and ¼ to produce the clock signals of 15, 10 and 7.5 MHz, one of which may be selected as desired by the changeover switch 69 so as to be supplied to the MCPU 61. If the clocks from the quartz oscillator 55, having a frequency of, for example, 16.9 MHz, are employed, they are frequency-divided by the frequency divider 68 by, for example, ½, and one of the clocks of 16.9 MHz from the quartz oscillator 55 and those of 8.45 MHz from the frequency divider 55 may be selected as desired by the changeover switch 69 so as to be supplied to MCPU 61. The result is that one of the quartz oscillators may be eliminated.

The quartz oscillator 67, the frequency divider 68 and the changeover switch 69 may be replaced by a so-called voltage-controlled oscillator for continuously changing the frequency of the clock signal supplied to MCPU 61.

From the foregoing it is seen that the present invention provides an optical disc reproducing apparatus for reproducing an optical disc on which video information etc. is recorded in addition to the video information, wherein a microcomputer for program execution and clock signal supplying means for supplying a frequency-variable clock signal to the microcomputer are provided for changing the speed of program execution according to the particular application or usage or according to the liking of the user.

What is claimed is:

1. An apparatus for reproducing audio and video data recorded on an optical disc comprising:
    disc drive means for rotating the optical disc, the optical disc being one of a plurality of types;
    reading means for reading data recorded on the optical disc;
    a first computer coupled to the disc drive means and to the reading means operative to control the disc drive means and the reading means in response to input from a user;
    audio demodulation means coupled to the reading means for demodulating at a first fixed rate in response to a first clock signal audio data read from the optical disk;
    first clock means for generating the first clock signal, the frequency of the first clock signal being a first fixed value;
    video demodulation means coupled to the reading means for demodulating at a second fixed rate in response to a second clock signal video data read from the optical disc;
    second clock means for generating the second clock signal, the frequency of the second clock signal being a second fixed value;
    a second computer coupled to the first computer for executing, at a speed proportional to a third clock signal, a program read at least in part from the optical disk, said program for controlling a display of information corresponding to the type of the optical disc; and
    third clock means for generating the third clock signal, the frequency of the third clock signal being user selectable to change the speed of execution of the program without affecting the demodulation of the audio data at the first fixed rate and demodulation of the video data at the second fixed rate.

2. The apparatus of claim 1 wherein said optical disc is a CD-I disc.

3. The apparatus of claim 1 wherein said third clock means comprises a quartz oscillator, a frequency divider for dividing the oscillation frequency of the quartz oscillator by a plurality of dividing ratios, and a changeover switch for selecting one of the frequency divided outputs from the frequency divider and supplying the selected output as the third clock signal to said second computer.

4. The apparatus of claim 1 wherein said third clock means comprises a voltage controlled oscillator for supplying the third clock signal, the frequency of which is capable of being changed continuously, 5. The apparatus of claim 1 wherein said third clock means comprises:
    a frequency divider coupled to one of the first clock means and the second clock means for dividing the oscillation frequency of one of the first clock means and the second clock means by a plurality of dividing ratios, and a changeover switch for selecting one of the frequency divided outputs from the frequency divider and supplying the selected output as the third clock signal to said second computer.

* * * * *

UNITED STATES PATENT AND TRADEMARK OFFICE
CERTIFICATE OF CORRECTION

PATENT NO. : 5,408,331
DATED : April 18, 1995
INVENTOR(S) : KIYOSHI OTA

It is certified that error appears in the above-indentified patent and that said Letters Patent is hereby corrected as shown below:

In column 3, line 32, please replace "OF" with --or--.

Signed and Sealed this

Twenty-fifth Day of July, 1995

Attest:

BRUCE LEHMAN

*Attesting Officer*   *Commissioner of Patents and Trademarks*